(12) United States Patent
Hardy

(10) Patent No.: US 7,793,421 B2
(45) Date of Patent: Sep. 14, 2010

(54) ARCHWAY MEASURING DEVICE

(76) Inventor: Derek Hardy, 2632 - 27 Street SW, Calgary, Alberta (CA) T3E 2G5

( * ) Notice: Subject to any disclaimer, the term of this patent is extended or adjusted under 35 U.S.C. 154(b) by 15 days.

(21) Appl. No.: 12/149,556

(22) Filed: May 5, 2008

(65) Prior Publication Data

US 2009/0272000 A1     Nov. 5, 2009

(51) Int. Cl.
B43L 9/04 (2006.01)
(52) U.S. Cl. .......... 33/194; 33/27.03; 33/809; 33/679.1; 33/494
(58) Field of Classification Search ............ 33/194, 33/27.03, 27.031, 27.032, 809, 810, 811, 33/812, 679.1, 494
See application file for complete search history.

(56) References Cited

U.S. PATENT DOCUMENTS

| | | | | |
|---|---|---|---|---|
| 838,696 | A * | 12/1906 | Doherty | 235/64.3 |
| 1,670,509 | A * | 5/1928 | Jung | 33/27.03 |
| 2,512,235 | A * | 6/1950 | Lankford | 33/27.03 |
| 2,863,218 | A | 12/1958 | Weaver | |
| 3,269,016 | A * | 8/1966 | Barnett | 33/27.03 |
| 3,664,025 | A * | 5/1972 | Barto | 33/27.03 |
| 3,808,691 | A | 5/1974 | Chase | |
| 4,216,584 | A | 8/1980 | Meissner et al. | |
| 4,419,672 | A | 12/1983 | Hird | |
| 4,685,216 | A * | 8/1987 | Woods et al. | 33/561.2 |
| 5,014,436 | A * | 5/1991 | Kozyrski et al. | 33/27.03 |
| 5,115,569 | A | 5/1992 | Kubo | |
| 5,515,299 | A | 5/1996 | Kaji et al. | |
| 5,551,161 | A | 9/1996 | Kubo | |
| 5,555,631 | A | 9/1996 | Houston | |
| 5,708,592 | A | 1/1998 | Kaji | |
| 5,778,949 | A | 7/1998 | Draves | |
| 6,378,580 | B1 | 4/2002 | Lovett | |
| 6,546,634 | B2 * | 4/2003 | Ming | 33/27.032 |
| 6,752,572 | B2 | 12/2003 | Talesky et al. | |
| 7,254,899 | B2 * | 8/2007 | Marocco et al. | 33/760 |
| 2001/0052189 | A1 | 12/2001 | Kreisler | |

* cited by examiner

*Primary Examiner*—Christopher W Fulton

(57) ABSTRACT

Disclosed is a method and apparatus for drawing an instrument across a curve in a surface for constructing an arch. The apparatus comprises a base member having a pivot and a plurality of first indicators and a slidable member having a plurality of second indicators. The slidable member is slidably positionable on the base member. The method comprises pivotably securing the base member to a surface, selecting one of the plurality of first indicators corresponding to the chord height and selecting one of the plurality of second indicators representing the chord height and length of the arch to be scribed. The method further comprises aligning the first and second selected indicators, and rotating the apparatus about the pivot hole so as to draw across an instrument located at a distal end of the slidable member across an arc so as to define the arch.

14 Claims, 8 Drawing Sheets

ARCHWAY MEASURING DEVICE

FIELD OF THE INVENTION

The present invention relates to the construction of curved archways in general and in particular to a method and apparatus for scribing an arch in an opening.

BACKGROUND OF THE INVENTION

Arches are known in the construction industry. Arches span an opening and enable the support of weight above the opening. Arches are known to provide a greater weight bearing ability due to transferring of compressive only forces to the two sides of the arch. Arches are also commonly used for architectural and design purposes.

Methods of measuring and constructing arches are known. In particular a circular arch may be scribed by fixing an arch or string to a single pivot point and rotating a writing implement or scribing instrument at a free end of the arm in a semi-circular arc. This method requires that the radius of the arch be known so that the scribing instrument may be located at the appropriate distance from the pivot point.

Many construction plans do not provide the radius of the arch to be utilized in a location. Such plans often provide only the height of the arch and the width of the opening in which the arch is to be located. It is therefore required for the construction personnel to determine the appropriate arch radius. Mathematical methods are known for calculating the radius of the arch, for example by utilizing the Pythagorean Theorem which results in:

$$R = ((L^L/_2)^2 + H^2)/2H$$

where R is the radius of the arch, L is the chord length and H is the height of the arch above its chord.

Although the radius may be calculated using geometric relationships, tools for calculating such relationships such as charts or calculators are often not available at a construction site. In addition, errors in performing such calculations at a construction site are also possible.

What is desirable is a reliable and expedient method and apparatus for use in measuring and scribing an arch that that does not require calculating the radius of the arch using the height of the arch and the width of the opening which the arch is required to span.

SUMMARY OF THE INVENTION

What is disclosed is a method and apparatus for scribing an arch requiring no calculations to be performed by the user for an archway opening wherein the height and width of the archway are provided.

According to a first embodiment of the present invention there is provided a method of scribing a curve in a surface for constructing an arch having first and second ends and a chord therebetween. The method comprises pivotably securing a base member having a plurality of first indicators to a surface through a pivot hole in the base member and selecting a first selected indicator of the plurality of first indicators having an associated value corresponding to the chord height of the arch to be scribed. The method further comprises selecting a second selected indicator of a plurality of second indicators on a slidable member wherein the slidable member is slidably locatable relative to the base member. The second selected indicator includes a first number portion representing chord height and a second number portion representing chord length of an arch to be scribed. The slidable member is slidably positioned so as to align the first and second selected indicators. A scribing instrument is located at a distal end of the sliding member. The base member and the slidable member are then rotated about the pivot hole so as to scribe an arc with the scribing instrument.

The method may further comprise securing the slidable member to the base member so as to fix the distance between the distal end of the slidable member and the pivot hole.

According to a further embodiment of the present invention there is provided a method and apparatus for scribing a curve in a surface for use in constructing an arch, the arch having first and second ends and a chord therebetween. The apparatus comprises a base member having a pivot and a plurality of first indicators having associated values representing chord height and a slidable member having a proximate end and an opposite distal end and a plurality of second indicators. The slidable member is slidably positionable on the base member such that the plurality of second indicators are adjustably alignable with the plurality of first indicators. The second indicators include a first associated number portion representing chord height and a second associated number portion representing chord length. The slidable member is positionable relative to the base member such that a first selected indicator of the plurality of first indicators corresponding to the chord height of the arch is aligned with a second selected indicator of the plurality of second indicators such that a scribing instrument located at the distal end is operable to scribe a curve corresponding to the arch when the base member and the slidable member are rotated about the pivot. Again, the second selected indicator has a first number portion corresponding to the chord height of the arch and a second number portion corresponding to the chord length of the arch.

The base member may further include a track for slidably guiding the moveable member. The track may comprise a pair of opposed retaining guides adapted to slidably retain the slidable member therebetween. The retaining guides may include hold-down shoulders adapted to retain the slidable member adjacent to the base member. The retaining guides may each include an elongate rib adapted to engage a corresponding channel in the slidable member. The channels may have closed ends so as to limit the slidable movement of the slidable member relative to the base member.

The moveable member may further include a connector at one of the proximate or distal end for connecting to a slidable extension member. The connector may be located at the proximate end. The connector may comprise at least one pin extending axially from the proximate end. At least one of the moveable member or the base member may further include a detachable plate having one of the first or second indicators. The pivot point may comprise a pivot hole extending through the base member wherein the pivot hole is adapted to receive a fastener for pivotally securing the base member to a surface.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention wherein similar characters of reference denote corresponding parts in each view.

DETAILED DESCRIPTION OF EMBODIMENTS OF THE INVENTION

Figure 1:
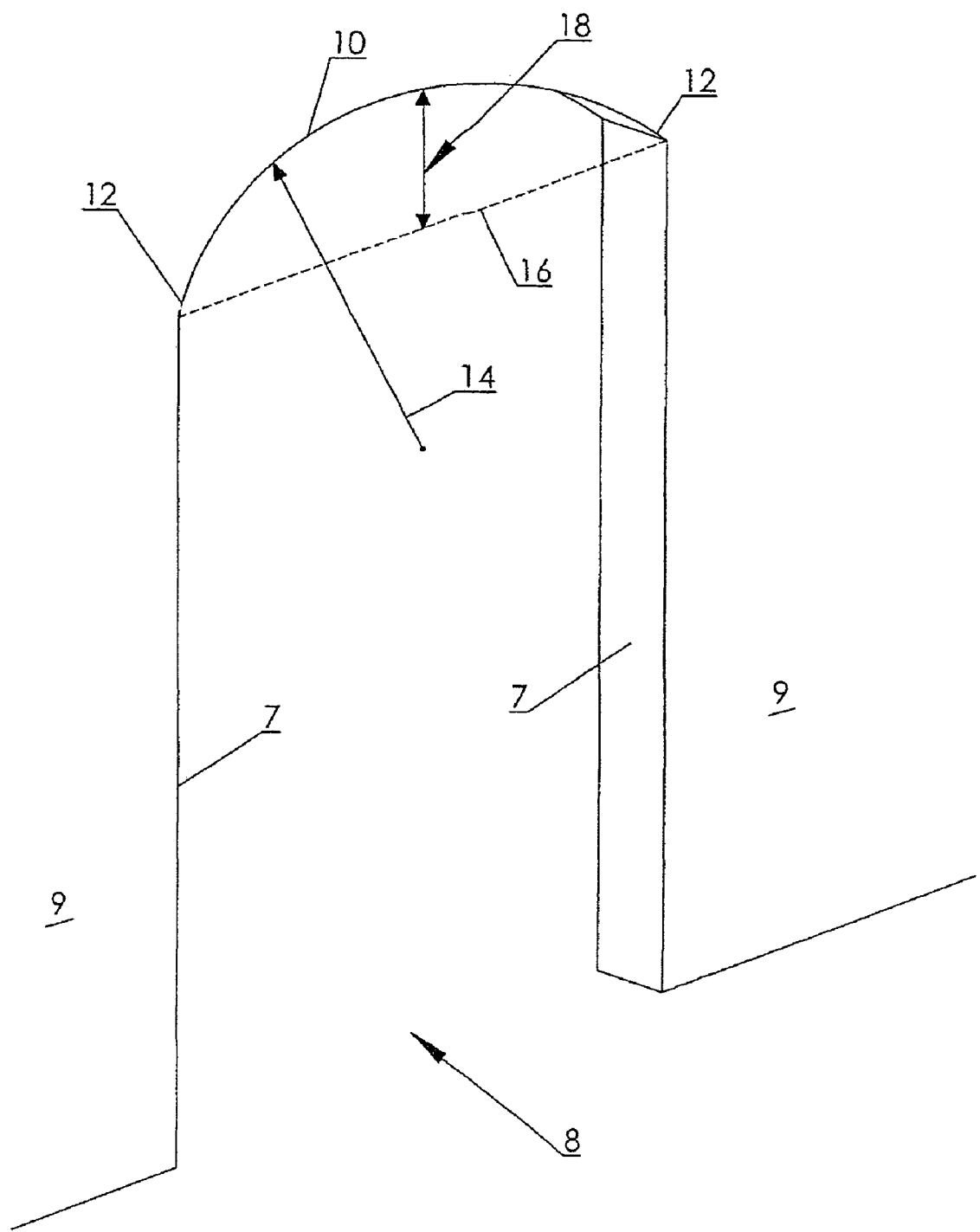
FIG. 1 is a perspective view of a wall section having an opening with an arched upper edge.

Referring to FIG. 1, an arch 10 may be formed at the top portion 6 of an opening 8 such as, for example, an opening in a wall 9. The arch 10 has opposite ends 12 and extends continuously between the sides 7 of the opening 8. Arch 10 has a radius generally indicated at 14. The arch 10 has a chord 16 extending from the ends 12. The maximum height of the arch 10 above the chord 16 is generally indicated at 18. This maximum arch height above its chord 18 may also be referred to as the chord height or sagitta of the arch. It will be appreciated that the opening 8 may have any one of a plurality of arches 10 formed therein each of which has a different corresponding radius. The chord 16 may be a length corresponding to the width of the opening 8 although for some architectural applications the length of the chord 16 and it's corresponding arch 10 may extend less than the width of the opening 8.

Figure 2:
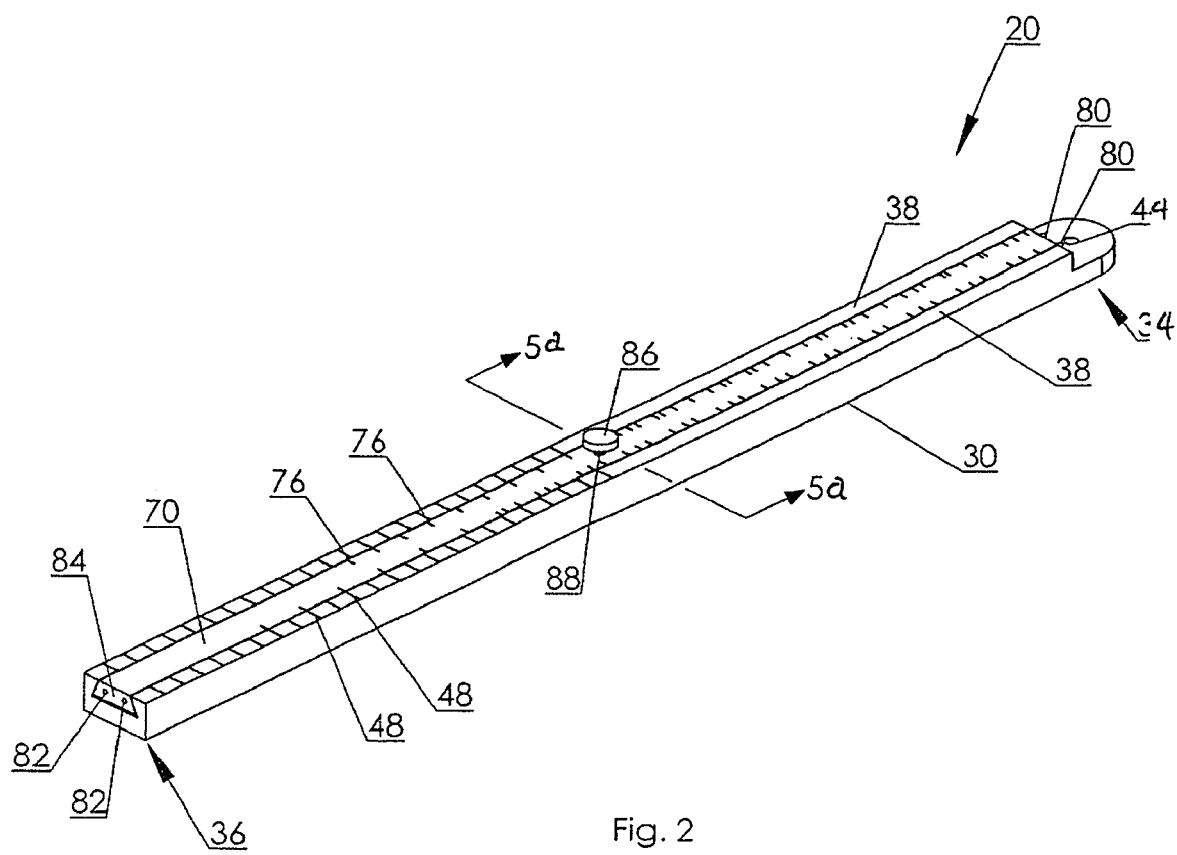
FIG. 2 is a perspective view of an arch scribing apparatus.

Referring now to FIG. 2, an arch scribing apparatus or cutting according to a first embodiment of the invention is shown generally at 20. The apparatus 20 comprises an elongate base member 30 and an elongate slidable member 70. The slidable member 70 is slidably mounted on or otherwise slidably disposed along and proximate to the base member 30 so as to be selectively adjustably positionable relative thereto.

Figure 3:
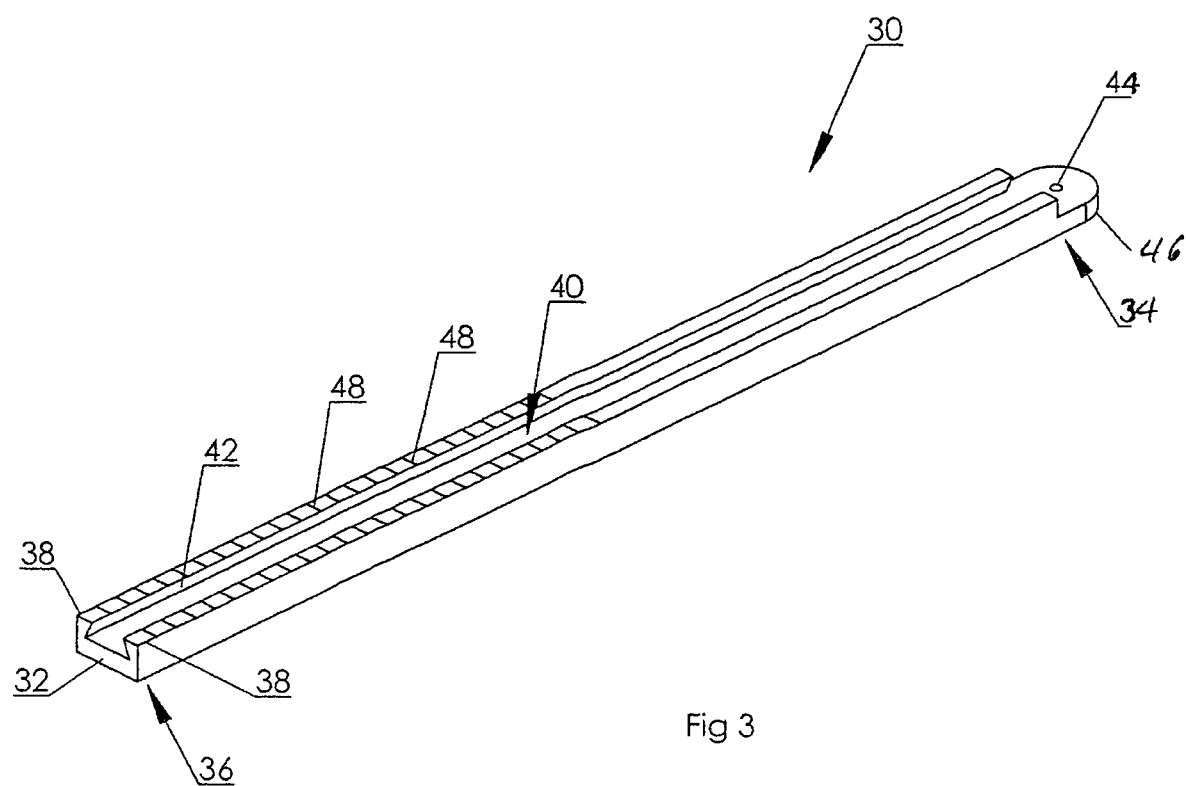
FIG. 3 is a perspective view of a base member of the arch scribing apparatus of FIG. 2.

Referring now to FIG. 3, the base member 30 comprises an elongate base plate 32 having first and second ends 34 and 36, respectively. An opposed facing pair of elongate retaining guides 38 are mounted on base plate 32 or formed as a unitary part thereof so as to define therebetween a track 40 for receiving the slidable member 70 in slidable engagement. The retaining guides 38 include inwardly inclined retaining surfaces 42 for retaining the slidable member 70 proximate to the base plate. The first end 34 of the base plate 32 includes a pivot hole 44 and a rounded end 46. The retaining guides 38 include a plurality of first indicators 48. Each of the plurality of first indicators corresponds to a measurement representing chord height 18.

Figure 4:
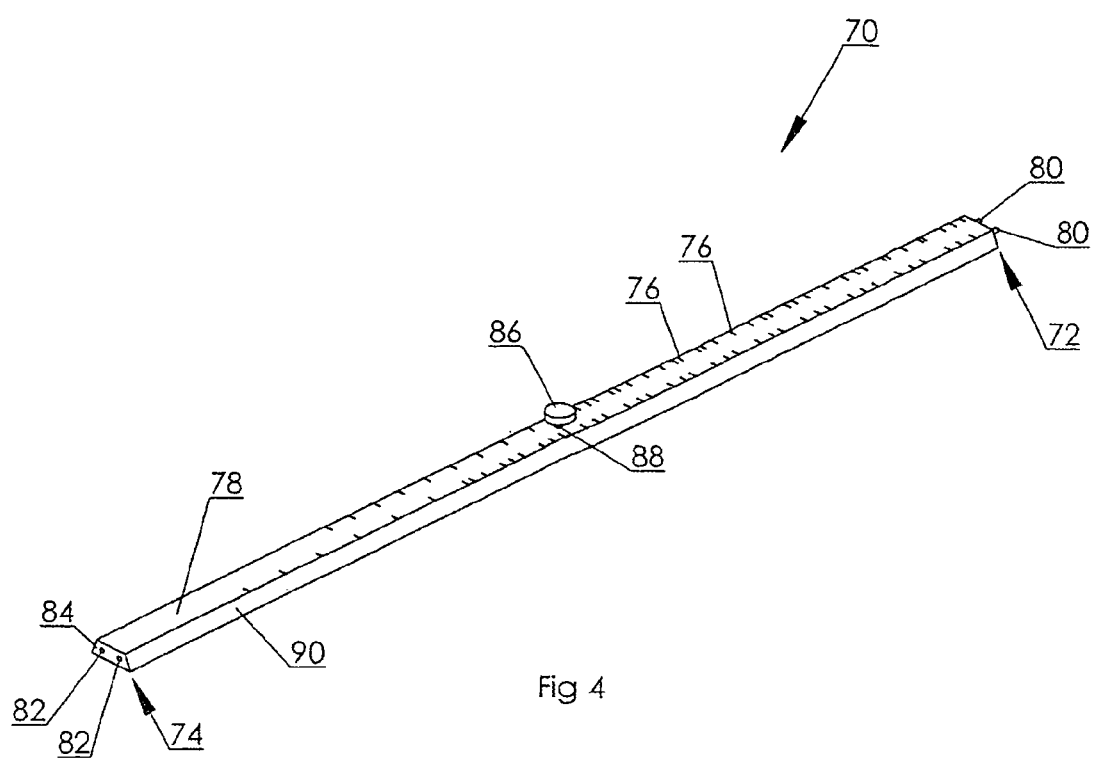
FIG. 4 is a perspective view of the slidable member of the scribing apparatus of FIG. 2.
Figure 5A:
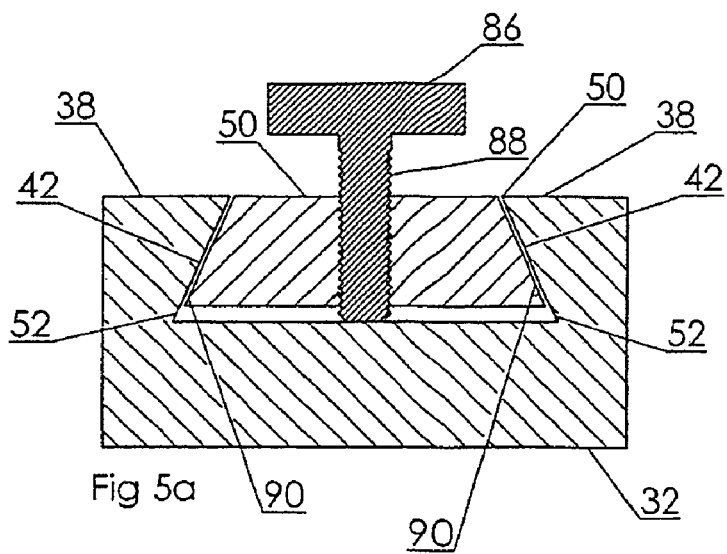
FIG. 5a is a sectional view along line 5a-5a of FIG. 2.
Figure 5B:
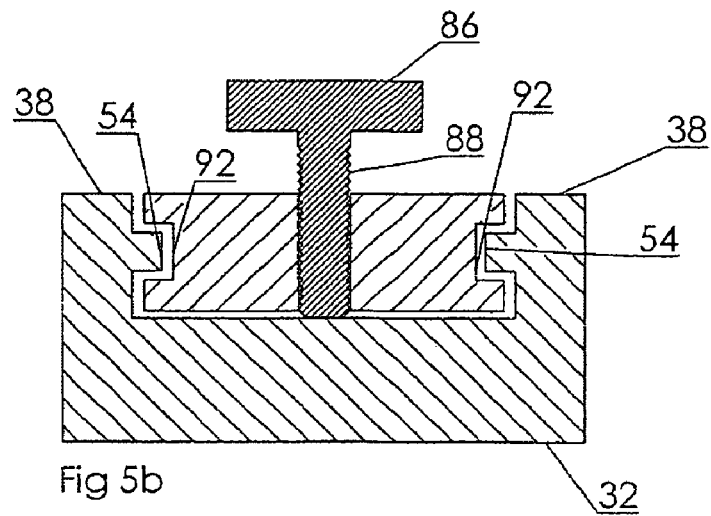
FIG. 5b is a cross-sectional view of an alternative embodiment of the scribing apparatus of the present invention.
Figure 5C:
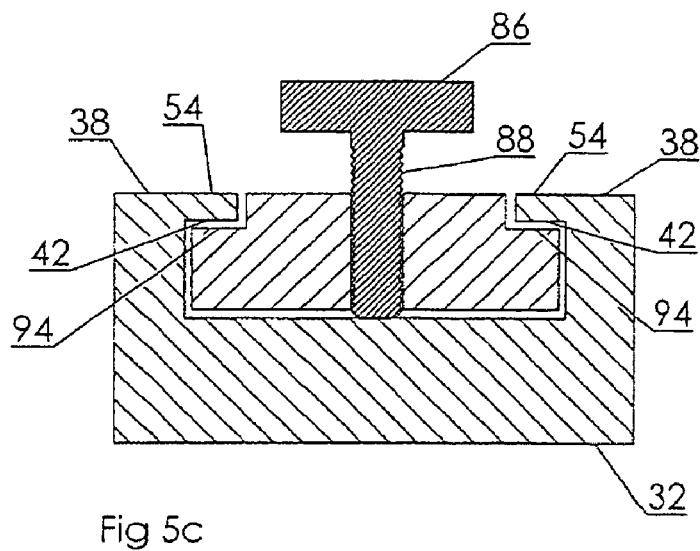
FIG. 5c is a cross-sectional view of a further alternative embodiment of the scribing apparatus of the present invention.
Figure 6:
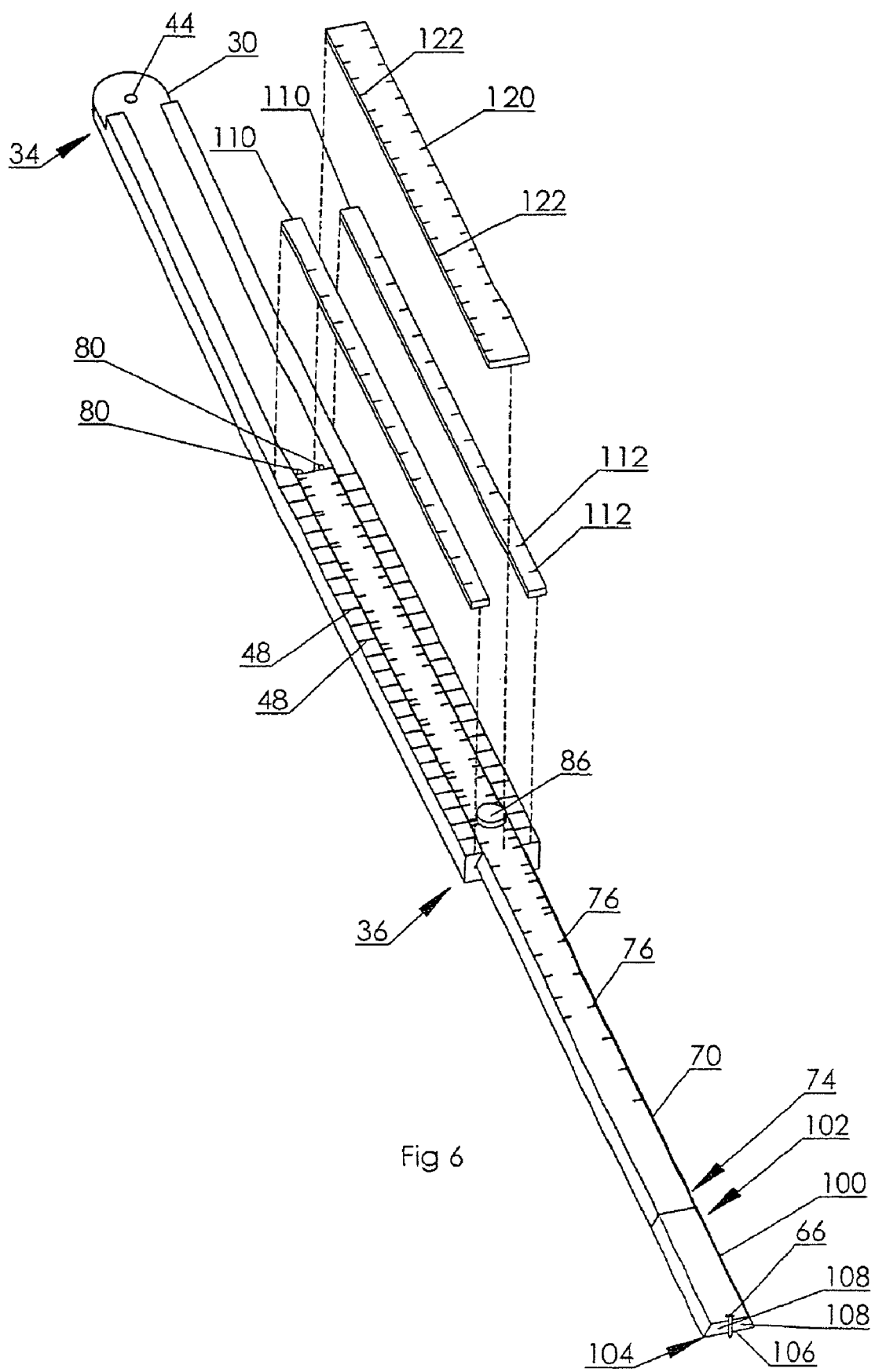
FIG. 6 is a perspective partially exploded view of an arch scribing apparatus having an extension member.
Figure 7:
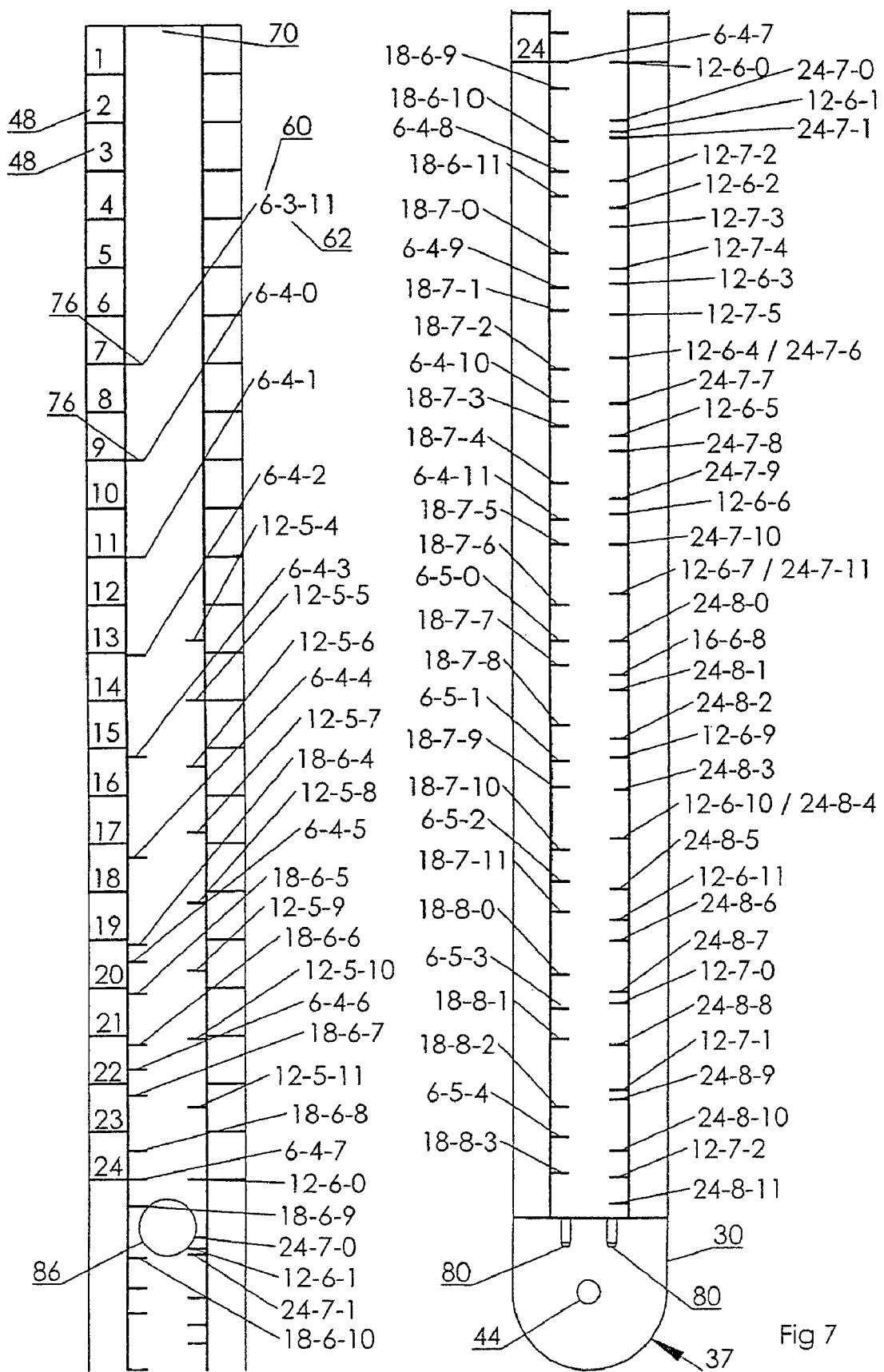
FIG. 7 is a top segmented plan view of the arch scribing apparatus of FIG. 2.

Referring to FIG. 4, the slidable member 70 comprises an elongate member having first and second ends 72 and 74, respectively and a plurality of second indicators 76 on a top surface 78 thereof. The second indicators 76 comprise first and second number components 60 and 62, respectively as illustrated in FIG. 7 wherein the first number component corresponds to a value representing chord height 18 and the second number component corresponds to a value representing the length of chord 16. The first end 72 of the slidable member 70 includes pins 80 extending axially from the first end 72 and the second end 74 includes blind bores 82. The blind bores 82 of the slidable member 70 are adapted to correspond to the pins 80 of an adjacent slidable member or an extension member 100 such that the pins 80 and blind bores 82 mate, thereby enabling slidable members 70 and extension members to be connected lengthwise as illustrated in FIG. 6. The second end 74 of the slidable member 70 includes an end surface 84 to which a scribing instrument 66 such as, for example, a nail or pencil may be mounted. It will be appreciated that other types of suitable scribing or marking instruments will also be useful. The slidable member 70 also includes a tensioning knob 86 attached to a threaded post 88 extending in threaded engagement through the slidable member. As illustrated in FIGS. 5a-5c, rotating knob 86 extends threaded post 88 through the slidable member 70 so as to engage the end of post 88 against base plate 32 in frictional engagement thereagainst so as to releasably secure the position of slidable member 70 relative to the base member 30. It will be appreciated that other types of methods of releasably securing the slidable member 70 to the base member 30 may also be utilized as are known in the art.

As illustrated in FIG. 5a, the retaining guides 38 may include angled retaining surfaces 42 having top edges 50 and bottom edges 52 wherein the top edges are disposed closer towards each other than the bottom edges. The slidable member may include angled sides 90 corresponding to the angled retaining surfaces 42 such that the retaining surfaces 42 bear on the angled sides 90 so as to retain the slidable member 70 proximate to the base plate 32. As illustrated in FIGS. 5b and 5c, the retaining guides 38 may optionally include hold-down shoulders or ribs 54 for retaining the slidable member 70 proximate to the base plate 32. The shoulder or rib 54 may be positioned at a middle portion of the slidable member 70 as illustrated in FIG. 5b or at a top portion of the slidable member 70 as illustrated in FIG. 5c. Where the shoulder or rib 54 is positioned at the middle portion of the slidable member 70, the slidable member may include a corresponding groove 92 adapted to receive the shoulder or rib 54. Optionally, illustrated in FIG. 5c, the slidable member 70 may include an open shoulder 94 corresponding to the shoulder or rib 54 of the retaining surface 42 where the shoulder or rib is positioned at proximate to a top portion of the slidable member.

Turning now to FIG. 6, the slidable member 70 is illustrated in an extended position and may include an extension member 100. The extension member 100 has first and second ends 102 and 104, respectively and includes a cross-section profile corresponding to the slidable member 70. The first end 102 of the extension member includes pins (not shown) adapted to be received within the blind bores 82 of the slidable member 70 so as to longitudinally connect the slidable member and extension member 100 such that a second end of the extension member includes an end surface 106 for mounting of instrument 66 thereon. Although instrument 66 is illustrated as a pointed-end object such as a scribe, it is intended to be within the scope of the present invention to include also cutting implements such as saws or routers, etc as instruments 66, or to also include drawing implements such as pencils, pens or markers as instruments 66. The second end 104 of the extension member 100 also includes blind bores 108 so as to receive pins of a further extension member.

Figure 8:
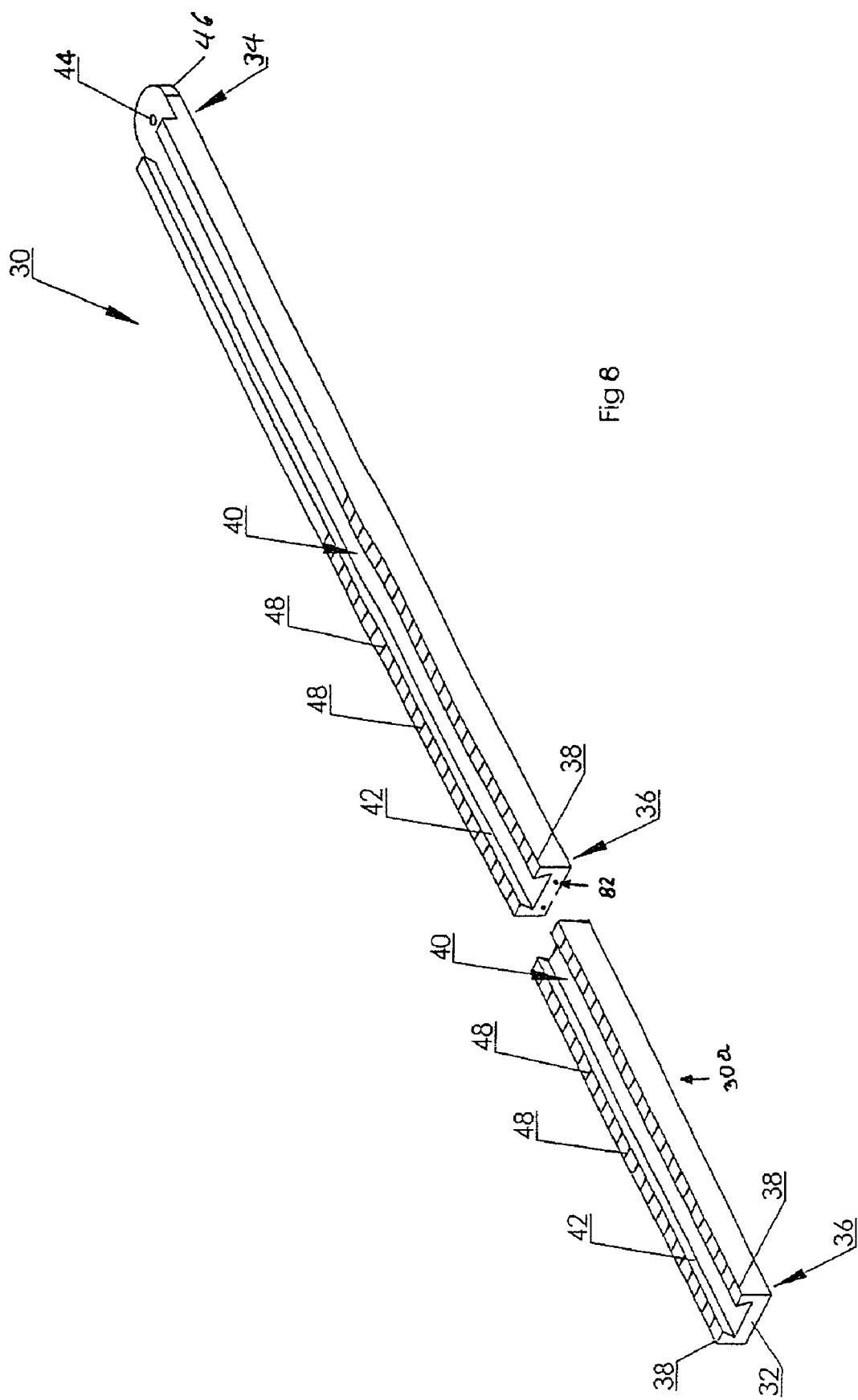
FIG. 8 is the view of FIG. 3 showing a base extension.

As illustrated in FIG. 6, the base member 30 may also include removable plates 110 having the plurality of first indicators 112. Different removable plates 110 may be provided corresponding to different extension members 100 as the effective length of the slidable member is varied. For example, a first plate 110 may contain markings or indicators 112 for six inch, twelve inch, eighteen inch, and twenty four inch rises of arch, and a second plate 110 which may be used instead of the first plate may contain indicators 112 for four, eight, ten and fifteen inch rises of arch, and so on. Where base member 30 has an extension 30a as seen in FIG. 8, again for example mounted by means of pins (not shown) mating into blind holes 82 in the end of base member 30, additional plates 110 may be used to accommodate the extension, similar to the first and second plates 110 except for use with the extension 30a. More than one extension may be used end-to-end, for each of which case, a substitute set of plates 110 may be employed. The slidable member 70 may also include a removable plate 120 having a second set of second indicators 122 for use with a slidable extension member 100.

Turning now to FIG. 7 a detailed top plan view of the arch scribing apparatus 20 is illustrated showing the first and second indicators 48 and 76, respectively. As described above, the first indicators 48 correspond to measurements representing chord height 18. The first indicators 48 may be measured and marked on the base member on a 1 to 1 scale in relation to the actual arch chord height that each indicator represents beginning at the distal end 36 of the base member 30. For example, as illustrated in FIG. 7, the numbers 1, 2, 3, etc associated with each first indicator 48 may represent the measurement in inches of the chord height 18.

As also described above the second indicators 76 include first and second number portions 60 and 62 representing chord height and chord length, respectively. Accordingly the second indicators 76 represents a single mark with may be alignable with a corresponding first indicator 48 such that the unique radius of the arch for each combination of chord height and length is presented. The first number portion 60 of the second indicator represents chord height that may be aligned with its corresponding first indicator 48 for a given chord height. The second number portion 62 represents the chord length and determines which of the first number portion 60 must be selected for alignment with its corresponding first indicator 48. As illustrated in FIG. 7, the first number portion 60 corresponds to an actual desired measurement of the chord height 18. For example, a first number portion 60 having the number "6" may represent a chord height of 6 inches. The second number portion 62 corresponds to an actual desired measurement of the chord length. For example, as illustrated in FIG. 7, the second number portion 62 includes two numbers, such as "3" and "11", for example. As illustrated, these two numbers may represent the chord length in feet and inches, for example of a chord length of 3 feet and 11 inches wide. It will be appreciated that for other uses, the second number portion may have only a single number where the chord length is provided only in inches or centimeters, for example.

The location of the second indicators 76 may be determined and measured out on the slidable member by utilizing a calculator or formula for each combination of chord height and length. For example the formula:

$$R = ((L/2)^2 + H^2)/2H$$

may be utilized to calculate the radius for a unique combination of chord height and length. Thereafter, the slidable member 70 may be extended relative to the base member 30 such that the radius calculated above is achieved for this combination of radius and height. A second indicator 76 may then be inscribed on the slidable member aligned with the first indicator 48 of that chord height. This process may be repeated for each combination of chord height and length that is desired. Optionally, for each chord height, such as for example 6 inches, an initial second indicator for that chord height may be calculated and measured. Thereafter the remaining second indicators for that chord height may be measured and marked by measuring the difference between each of the calculated radii and the radius for the initially scribed second indicator along the slidable member 70. It will be appreciated that the second indicators 76 may also be measured and marked on the slidable member 70 by measuring along the slidable member provide the other dimensions of the arc scribing apparatus are known.

Operation

In operation a user locates a desired second indicator 76 wherein the first number portion 60 corresponds to the chord height 18 and the second number portion 62 corresponds to the length of chord 16 of the arch 10 to be scribed. In some applications, the length of chord 16 may be the width of the opening 8 above which the arch 10 is to be formed. The user slidably locates the slidable member 70 relative to the base member 30 such that one of the first number portions 60 of the desired second indicator 76 is aligned with the first indicator 48 having a corresponding value to the first number portion 60. The appropriate one of the first numbered portions 60 is determined by choosing the one having the second number portion 62 corresponding to the desired chord length 16.

The slidable member 70 may then be secured relative to the base member 30 by tightening the tensioning knob 86 so as to lengthwise fix the slidable member to the base member. The base member 30 is then pivotally secured to a surface such as, for example a sheet of plywood by placing a nail or other suitable fastener through the pivot hole 44. A second sheet of material such as another sheet of plywood or drywall, for example may then be placed under the arch scribing apparatus 20. A scribing instrument 66 may then be located at the end surface 84 of the slidable member such that rotation of the arch scribing apparatus 20 about the pivot hole 44 moves the scribing instrument 66 such that the scribing instrument scribes an arch 10 of an appropriate radius 14 into the second sheet of material.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method of drawing an instrument across a curve in a surface for constructing an arch having first and second ends and a chord therebetween wherein the arch has an apex at a maximum height of the arch above the chord, the method comprising:

providing a base member having a plurality of first indicators thereon and a slidable member having a plurality of second indicators thereon wherein said base member is adapted for slidable mounting of said slidable member thereon for relative sliding therebetween, and wherein said indicators reflect a range of characterizing arch dimensions, pivotably securing said base member to a surface through a pivot hole in a base end of said base member;

selectively slidably locating said slidable member relative to said base member so as to align at least one of said second indicators on said slidable member with at least one of said first indicators on said base member according to corresponding dimensions characterizing said arch from said range;

locating an instrument at a distal end of said sliding member; and rotating said base member and said slidable member about said pivot hole so as to draw said instrument across an arc having said corresponding dimensions, wherein said first indicators correspond to values representing the height of the arch above its corresponding chord and wherein said second indicators include values representing a distance between the first and second ends of the chord.

2. The method of claim 1 wherein said first indicators correspond to values representing the height of the arch above its corresponding chord.

3. The method of claim 1 wherein said second indicators include values representing a distance between the first and second ends of the chord.

4. The method of claim 1 further comprising securing said slidable member to said base member so as to fix the distance between said distal end of said slidable member and said pivot hole.

5. An apparatus for drawing an instrument across a curve in a surface for use in constructing an arch, the arch having first and second ends and a chord therebetween, the apparatus comprising:
   a base member having a pivot and a plurality of first indicators; and
   a slidable member having proximate and distal ends and a plurality of second indicators, said slidable member being slidably positionable on said base member such that said second indicators on said slidable member are adjustably alignable with said first indicators on said base member,
   wherein extension of said slidable member to an extended position aligns one of said first indicators with one of said second indicator such that an instrument located at said distal end is operable to drawn across a curve corresponding to said arch when said base member and said slidable member are rotated about said pivot,
   wherein said first indicators correspond to values representing the height of the arch above its corresponding chord and wherein said second indicators include values representing a distance between the first and second ends of the chord.

6. The apparatus of claim 5 wherein said base member further includes a track for slidably guiding said moveable member.

7. The apparatus of claim 6 wherein said track comprises a pair of opposed retaining guides adapted to slidably retain said slidable member therebetween.

8. The apparatus of claim 7 wherein said retaining guides include hold-down shoulders adapted to retain said slidable member adjacent to said base member.

9. The apparatus of claim 7 wherein said retaining guides each includes an elongate rib adapted to engage a corresponding channel in said slidable member.

10. The apparatus of claim 5 wherein said moveable member or said base member further include a connector at one of said proximate or distal end for connecting to a slidable member extension.

11. The apparatus of claim 10 wherein said connector is located at said proximate end.

12. The apparatus of claim 11 wherein said connector comprises at least one pin extending axially from said proximate end.

13. The apparatus of claim 5 wherein at least one of said moveable member or said base member further includes a detachable plate having one of said first or second indicators.

14. The apparatus of claim 5 wherein said pivot point comprises a pivot hole extending through said base member, said pivot hole being adapted to receive a fastener for pivotally securing said base member to a surface.

* * * * *